US010590222B2

(12) United States Patent
Kamata et al.

(10) Patent No.: US 10,590,222 B2
(45) Date of Patent: Mar. 17, 2020

(54) THERMOPLASTIC RESIN COMPOSITION

(71) Applicant: Techno-UMG Co., Ltd., Tokyo (JP)

(72) Inventors: Ichiro Kamata, Ube (JP); Hiroyuki Atsuta, Ube (JP)

(73) Assignee: Techno-UMG Co., Ltd., Tokyo (JP)

(*) Notice: Subject to any disclaimer, the term of this patent is extended or adjusted under 35 U.S.C. 154(b) by 0 days.

(21) Appl. No.: 16/073,656

(22) PCT Filed: Feb. 3, 2017

(86) PCT No.: PCT/JP2017/003974
§ 371 (c)(1),
(2) Date: Jul. 27, 2018

(87) PCT Pub. No.: WO2017/138455
PCT Pub. Date: Aug. 17, 2017

(65) Prior Publication Data
US 2019/0040176 A1 Feb. 7, 2019

(30) Foreign Application Priority Data
Feb. 12, 2016 (JP) ................... 2016-025267

(51) Int. Cl.
C08F 279/04 (2006.01)
C08F 265/04 (2006.01)
C08L 25/12 (2006.01)

(52) U.S. Cl.
CPC .......... *C08F 279/04* (2013.01); *C08F 265/04* (2013.01); *C08L 25/12* (2013.01); *C08L 2205/025* (2013.01); *C08L 2205/03* (2013.01)

(58) Field of Classification Search
CPC ................. C08F 265/04; C08F 220/06; C08F 2220/1825; C08F 279/04
See application file for complete search history.

(56) References Cited

U.S. PATENT DOCUMENTS

| | | |
|---|---|---|
| 2008/0004363 A1 | 1/2008 | Rosenberger |
| 2009/0130451 A1 | 5/2009 | Farrell |
| 2011/0224355 A1 | 9/2011 | Tomita et al. |
| 2015/0183155 A1 | 7/2015 | Saito |
| 2016/0115311 A1 | 4/2016 | Kuroda et al. |

FOREIGN PATENT DOCUMENTS

| | | |
|---|---|---|
| JP | 2006187785 A | 7/2006 |
| JP | 2006187875 A | 7/2006 |
| JP | 2006188599 A | 7/2006 |
| JP | 2006265545 A | 10/2006 |
| JP | 2007-008974 A | 1/2007 |
| JP | 2007-269890 A | 10/2007 |
| JP | 4017994 B | 12/2007 |
| JP | 2008517112 A | 5/2008 |
| JP | 2011-111503 A | 6/2011 |
| KR | 20150143834 A | 12/2015 |
| WO | 2010/029937 A1 | 3/2010 |
| WO | 2014/007382 A1 | 1/2014 |
| WO | 2015119040 A1 | 8/2015 |

OTHER PUBLICATIONS

International Search Report and Written Opinion dated Apr. 18, 2017 for PCT Application No. PCT/JP2017/003974.
Supplementary European Search Report dated Sep. 9, 2019, for European Application No. 17750178.0.
Office Action dated Dec. 12, 2019 in Indian Patent Application No. 201817030092, and english translation thereof.
Communicated dated Jan. 1, 2020 from European Patent Office in European Patent Application No. 17750178.0.

*Primary Examiner* — Mark S Kaucher
(74) *Attorney, Agent, or Firm* — Plumsea Law Group, LLC.

(57) ABSTRACT

The present invention is to provide a thermoplastic resin composition capable of obtaining a molded article that is excellent in appearance after laser welding and a color tone and has sufficient impact property as a resin member. In addition, the present invention is to provide a molded article that is excellent in appearance after laser welding and a color tone and has sufficient impact resistance as a resin member. As a result of intensive studies, the present inventors have found that the above problems can be solved by controlling a thermoplastic resin composition containing rubber-containing graft copolymer to have appropriate reflectance in the visible light and absorptivity in the near-infrared region, and have completed the present invention.

4 Claims, No Drawings

THERMOPLASTIC RESIN COMPOSITION

CROSS-REFERENCE TO RELATED APPLICATION(S)

Priority is claimed on Japanese Patent Application No. 2016-025267, filed on Feb. 12, 2016, the disclosure of which is hereby incorporated by reference.

BACKGROUND OF THE INVENTION

Technical Field

The present invention relates to a thermoplastic resin composition.

Background Art

In recent years, according to the development of technology, resins have been expanded application fields thereof more and more, for example, vehicle parts, home appliance parts, and various industrial materials. Secondary processing technology relating to bonding of the resins is also one of the technology contributing to the expansion.

Examples of bonding of resins include: mechanical bonding by screws, bolts, or the like; bonding by an adhesive such as hot melt; thermal bonding by melting by applying heat, as represented by hot plate welding; vibration welding using frictional heat generated by vibrating bonding portion; and laser welding using absorption and heat generation of a bonding portion irradiated with laser light. In recent years, usefulness increases in hot plate welding, vibration welding, and laser welding, from the viewpoints of reduction of processing steps, reduction in weight, and reduction of environmental load.

In the laser welding, two materials of "transmitting material" transmitting laser light and "absorbing material" absorbing laser light are bonded to each other, in general. The laser light with which a material contact interface is irradiated in a non-contact manner from a transmitting material side is transmitted through the transmitting material as it is to reach a surface of the absorbing material. Light energy absorbed at the surface of the absorbing material is converted into heat to melt an irradiated site. In addition, the melting heat also reaches the transmitting material and the transmitting material is also melted. Thereafter, the melted portion is solidified along with cooling to be fused. Resin bonded body that has been laser-welded such steps is excellent in strength, air tightness, and appearance (for example, burr is not created), and has a merit, that is, extremely good from the viewpoints of work environment, damage to built-in parts, and the like.

However, when irradiation with laser light is too strong, a calorific value of resin increases. Therefore, poor appearance such as foaming, scorching, and discoloration is caused. On the other hand, when irradiation with the laser light is too weak, bonding strength may be lowered, and in some cases, defect that welding is not sufficient may occur. Accordingly, it is very important to control the calorific value of resin within an appropriate range when performing laser welding.

From the viewpoint of controlling the calorific value, a method of adjusting optical characteristic of material with respect to the laser light is considered. As such a technique, for example, PTLs 1 to 3 disclose resin compositions exhibiting a predetermined transmittance with respect to a specific wavelength or a wavelength in a specific range.

However, the resin compositions described in PTLs 1 to 3 allow laser light having a sufficient energy amount to reach a welding portion by specifying all transmittance to a certain value or more, that is, are used as a "transmitting material", and these are not a technology suitable for use as "absorbing material".

Light incident on the material is divided into transmitted light, reflected light, and absorbed light. In other words, in a case where a proportion of the incident light is 100%, a relationship of transmittance+reflectance+absorptivity=100% is established as the proportion of each light component. In a case of "transmitting material", the transmittance attracts attention from the viewpoint of allowing the laser light to reach the welding portion. On the other hand, in a case of "absorbing material", optical characteristic to be attracted attention is not the transmittance but the absorptivity, from the viewpoint of controlling the calorific value within an appropriate range. The reason is that when the absorbing material is thermally melted by the energy of laser light, if an absorbed amount thereof is excessively large, poor appearance such as foaming, scorching, and discoloration is caused and if an absorbed amount is excessively small, defect that welding is not sufficient is caused. As above, it is very important to control the absorptivity of the "absorbing material" in order to obtain a molded article excellent in laser weldability.

Meanwhile, a molded article obtained from thermoplastic resin is usually used in a state (colored molded article) colored with dye or pigment, and a color tone thereof is very important from the viewpoint of article design. Such a color tone is, in principle, the result of observing the light having various wavelengths in the visible light region, reflected by materials, with human eyes. The color tone varies depending on the wavelength of the light reflected by the materials, but a dark color tone such as black or dark gray represents that the reflectance of the light in the visible light region is generally low. In other words, the optical characteristic to be attracted attention from the viewpoint of controlling the color tone is the reflectance of the visible light region, and particularly in the dark color tone, it is very important to control the reflectance of the visible light region within a specific low range.

Regarding a wavelength of light in laser welding, light having a wavelength in the near-infrared region is suitably used from the viewpoint of excellent oscillation efficiency. On the other hand, a wavelength of light in the color tone corresponds to the light having the wavelength in the visible light region. That is, it becomes possible to provide a material excellent in the laser weldability and the color tone by controlling the absorptivity in the near-infrared region and the reflectance in the visible light region to be appropriate. Further, as a feature of the present invention, it becomes possible to provide a material extremely excellent in a balance between the laser weldability and the color tone by controlling a ratio between the absorptivity in the near-infrared region and the reflectance in the visible light region to be appropriate.

CITATION LIST

PTL 1 Japanese Patent No. 4017994
PTL 2 Japanese Unexamined Patent Application, First Publication No. 2007-8974
PTL 3 Japanese Unexamined Patent Application, First Publication No. 2007-269890

SUMMARY OF THE INVENTION

Technical Problem

The present invention is to provide a thermoplastic resin composition capable of obtaining a molded article that is excellent in appearance after laser welding and a color tone and has sufficient impact property as a resin member. In addition, the present invention is to provide a molded article, formed of a thermoplastic resin composition, that is excellent in appearance after laser welding and a color tone and has sufficient impact resistance as a resin member.

Technical Solution

As a result of intensive studies, the present inventors have found that the above problems can be solved by controlling a thermoplastic resin composition containing rubber-containing graft copolymer to have appropriate reflectance in the visible light and absorptivity in the near-infrared region, and have completed the present invention.

That is, the present invention includes the following aspects.

1) A thermoplastic resin composition including a graft copolymer (A) obtained by grafting a vinyl polymer (a2) to a rubbery polymer (a1), in which when light reflectance (% R) and light absorptivity (% A) represented by the following Equation (1) are measured over a region from a visible light region to a near-infrared light region at a wavelength interval of 1 nm, an average value (visible % R) of the light reflectance at 380 nm to 780 nm is 5% to 10%, and an average value (near infrared % A) of the light absorptivity at 780 nm to 1180 nm is 25% to 93%.

Light absorptivity (% $A$)=100−light transmittance (% $T$)−light reflectance (% $R$)  Equation (1):

2) The thermoplastic resin composition according to 1, in which a ratio (near infrared % A/visible % R) between the average value of the light absorptivity in the near-infrared region and the average value of the light reflectance in the visible light region is 16.5 to 4.5.

3) A molded article obtained by molding the thermoplastic resin composition according to 1 or 2, above.

Advantageous Effects of Invention

According to the thermoplastic resin composition of the present invention, it is possible to obtain a molded article that is excellent in appearance after laser welding and a color tone and has sufficient impact resistance as a resin member.

The molded article of the present invention is excellent in appearance after laser welding and a color tone and has sufficient impact resistance as a resin member.

DETAILED DESCRIPTION

Hereinafter, the present invention will be described in detail.

In the following description, "molded article" is obtained by molding the thermoplastic resin composition of the present invention. In addition, unless otherwise noted in the following description, the expression "excellent in color tone" means that the molded article shows dark color tone (dark gray, black, and the like). In addition, the expression "excellent in weld appearance" means that a bonding portion after laser welding is prevented from being scorched or discolored.

"Thermoplastic Resin Composition"

The Thermoplastic Resin Composition of the Present Invention Includes a Graft Copolymer (A).

Graft Copolymer (A)

A rubbery polymer (a1) forming the graft copolymer (A) is not particularly limited, but examples thereof include: a butadiene rubbery polymer such as polybutadiene, a styrene/butadiene copolymer, an acrylonitrile/butadiene copolymer, and an acrylate/butadiene copolymer; a conjugated diene rubbery polymer such as isoprene, chloroprene, and a styrene/isoprene copolymer; an acrylic rubbery polymer such as butyl polyacrylate; an olefinic rubbery polymer such as an ethylene/propylene copolymer; a silicone rubbery polymer such as polyorganosiloxane; natural rubber, butyl rubber, urethane rubber, chlorinated polyethylene, epichlorohydrin rubber, fluorine rubber, and polysulfide rubber. One kind thereof may be used alone and two or more kinds thereof may be used in combination. These rubbery polymers can be used from monomers, and a structure of the rubbery polymer may be a composite rubber structure or a core/shell structure.

Among the above-described rubbery polymer, the butadiene rubbery polymer, the acrylic rubbery polymer, the olefinic rubbery polymer, the silicone rubbery polymer, and the composite rubber structure or the core/shell structure of these rubber-like polymers are preferable in impact resistance or molded appearance of an obtained molded article.

A gel content of the rubbery polymer (a1) is preferably 50% to 99% by mass, more preferably 60% to 95% by mass, and particularly preferably 70% to 85% by mass. When the gel content is within the above range, the impact resistance of the molded article becomes better.

The gel content of the rubbery polymer (a1) can be measured as follows.

The weighed rubbery polymer (a1) is dissolved in a suitable solvent at room temperature (23° C.) over 20 hours. Next, centrifugation is performed and the supernatant is decanted to dry the remaining insoluble matter at 60° C. for 24 hours and then weighed. A proportion (% by mass) of the insoluble matter to the firstly weighed rubbery polymer (a1) is determined, and this is assumed as the gel content of the rubbery polymer (a1).

Examples of the solvent used for dissolving the rubbery polymer (a1) include toluene and acetone.

An average particle diameter of the rubbery polymer (a1) is not particularly limited, but is preferably 0.1 to 1 μm and more preferably 0.2 to 0.5 μm. When the average particle diameter is within the above range, the impact resistance of the molded article is improved.

The average particle diameter of the rubbery polymer (a1) can be calculated from a particle size distribution obtained by measuring a volume-based particle size distribution using a particle size distribution measuring device.

The graft copolymer (A) has a form in which a vinyl polymer (a2) obtained by polymerizing various vinyl monomers is grafted to the rubbery polymer (a1).

The vinyl monomers are not particularly limited, but examples thereof include an aromatic vinyl compound, alkyl (meth)acrylate, and vinyl cyanide compound.

Examples of the aromatic vinyl compound include styrene, α-methylstyrene, and p-methylstyrene.

Examples of the alkyl (meth)acrylate include methyl methacrylate, ethyl methacrylate, 2-ethylhexyl methacrylate, methyl acrylate, ethyl acrylate, n-butyl acrylate, isobutyl acrylate, and t-butyl acrylate.

Examples of the vinyl cyanide compound include acrylonitrile and methacrylonitrile.

One kind of these vinyl monomers may be used alone and two or more kinds thereof may be used in combination.

Among the above-described vinyl monomers, it is preferable to use styrene and acrylonitrile together since the impact resistance of the molded article is further improved.

The graft copolymer (A) is obtained by graft-polymerizing the vinyl polymer (a2) to the rubbery polymer (a1).

A method for carrying out the graft polymerization is not particularly limited, but emulsion polymerization is preferable since a reaction can be controlled to proceed stably. Specifically, examples thereof include: a method in which a vinyl monomer is charged to the rubbery polymer (a1) all at once and then polymerized; a method in which some of vinyl monomers are charged to the rubbery polymer (a1) in advance and the remainder is added dropwise to the polymerization system while carrying out polymerization at any time; and a method in which polymerization is carried out at any time while adding entire amount of the vinyl monomers to the rubbery polymer (a1), and the polymerization can be carried out by dividing these methods into one or more stages. In addition, the polymerization can also be carried out by changing a kind or a composition ratio of the vinyl monomers in each stage.

A mass ratio between the rubbery polymer (a1) and the vinyl polymer (a2) is not particularly limited, but it is preferable that the rubbery polymer (a1) is 10% to 80% by mass and the vinyl polymer (a2) is 20% to 90% by mass and it is more preferable that the rubbery polymer (a1) is 30% to 70% by mass and the vinyl polymer (a2) is 30% to 70% by mass (here, the total of the rubbery polymer (a1) and the vinyl polymer (a2) is 100% by mass). When the graft polymerization is performed with such a mass ratio, the molded article tends to have more excellent impact resistance.

In general, a radical polymerization initiator and an emulsifier are used for the graft polymerization.

Examples of the radical polymerization initiator include peroxide, an azo initiator, and a redox initiator combining an oxidizing agent and a reducing agent. Among these, the redox initiator is preferable, and a sulfoxylate initiator combining ferrous sulfate, disodium ethylenediaminetetraacetate, sodium formaldehyde sulfoxylate, and hydroperoxide is particularly preferable.

In addition, when carrying out the radical polymerization, in order to control a molecular weight and a graft rate of the obtained graft copolymer (A), various known chain transfer agents may be added.

The emulsifier is not particularly limited, but examples thereof include various carboxylates such as sodium sarcosinate, potassium fatty acid, sodium fatty acid, dipotassium alkenyl succinate, and rosin acid soap, since stability of latex during radical polymerization is excellent and a polymerization rate increases.

Among these, the dipotassium alkenylsuccinate is preferable since generation of gas can be suppressed when the obtained graft copolymer (A) and thermoplastic resin composition including the graft copolymer (A) are molded at a high temperature.

The graft copolymer (A) is usually obtained in a latex state. Examples of a method of recovering the graft copolymer (A) from the latex of the graft copolymer (A) include: a wet method in which the latex of the graft copolymer (A) is coagulated in a slurry state by putting the latex into hot water in which a coagulant dissolved; and a spray drying method in which the graft copolymer (A) is semi-directly recovered by spraying the latex of the graft copolymer (A) in heated atmosphere.

Examples of the coagulant used in the wet method include inorganic acid such as sulfuric acid, hydrochloric acid, phosphoric acid, and nitric acid; and metal salt such as calcium chloride, calcium acetate, and aluminum sulfate, and the coagulant is selected according to the emulsifier used in the polymerization. For example, in a case where only the carboxylic acid soap such as fatty acid soap or a rosin acid soap is used as the emulsifier, one or more of the above-described coagulants can be used. In addition, in a case where an emulsifier exhibiting stable emulsifying power even in an acidic region, such as the sodium alkylbenzenesulfonate is used as the emulsifier, the metal salt is suitable as the coagulant.

When using the wet method, slurry-like graft copolymer (A) is obtained. Examples of a method of obtaining the graft copolymer (A) in a dried state from the slurry-like graft copolymer (A) include a method in which first, the remaining emulsifier residue is eluted into water and washed, then, the slurry is dehydrated by centrifugation, press dehydrator, or the like to dry with a pneumatic conveying dryer; and a method of carrying out the dehydration and the drying at the same time with a squeeze dehydrator, an extruder, or the like. A dried graft copolymer (A) in a form of powder or particulate is obtained such a method.

A washing condition is not particularly limited, but it is preferable to perform washing in a condition through which an amount of the emulsifier residue contained in 100% by mass of dried graft copolymer (A) is in the range of 0.5% to 2% by mass. When the emulsifier residue in the graft copolymer (A) is 0.5% by mass or more, fluidity of the obtained graft copolymer (A) and the thermoplastic resin composition containing the graft copolymer tends to be further improved. On the other hand, when the emulsifier residue in the graft copolymer (A) is 2% by mass or less, generation of gas can be suppressed when the thermoplastic resin composition is molded at a high temperature.

Instead of recovering the graft copolymer (A) discharged from the squeeze dehydrator or the extruder, the graft copolymer (A) may be directly sent to an extruder or a molding machine for manufacturing a thermoplastic resin composition to obtain the molded article.

Another Resin

The thermoplastic resin composition may contain only the above-described graft copolymer (A), but it is preferable to further contain thermoplastic resin (another thermoplastic resin (B)) in addition to the graft copolymer (A), from the viewpoint of the moldability of the obtained thermoplastic resin composition or molded appearance of the molded article.

The other thermoplastic resin (B) is not particularly limited; but examples thereof include acrylonitrile-styrene copolymer (AS resin), acrylonitrile-α-methylstyrene copolymer (αSAN resin), styrene-maleic anhydride copolymer, acrylonitrile-styrene-N-substituted maleimide terpolymer, styrene-maleic anhydride-N-substituted maleimide terpolymer, acrylonitrile-butadiene-styrene copolymer (ABS resin), acrylonitrile-styrene-alkyl (meth)acrylate copolymer (ASA resin), acrylonitrile-ethylene-propylene-diene-styrene copolymer (AES resin), polymethylmethacrylate, polycarbonate resin, polybutylene terephthalate (PBT resin), polyethylene terephthalate (PET resin), polyvinyl chloride, polyolefin such as polyethylene and polypropylene, styrene-based elastomer such as styrene-butadiene-styrene (SBS), styrene-butadiene (SBR), hydrogenated SBS, and styrene-isoprene-styrene (SIS), various olefinic elastomers, various polyester elastomers, polystyrene, methyl methacrylate-styrene copolymer (MS resin), acrylonitrile-styrene-methyl methacrylate copolymer, polyacetal resin, modified polyphenylene ether (modified PPE resin), ethylene-vinyl acetate copolymer, PPS resin, PES resin, PEEK resin, polyarylate, liquid crystal polyester resin, and polyamide resin (nylon).

One kind of the other thermoplastic resin (B) may be used alone and two or more kinds thereof may be used in combination.

The content of the graft copolymer (A) in the thermoplastic resin composition is preferably 20% to 60% by mass and the content of the other thermoplastic resin (B) is preferably 40% to 80% by mass (here, the total of the graft copolymer (A) and the other thermoplastic resin (B) is 100% by mass). When the content of the graft copolymer (A) is 20% by mass or more (the content of the other thermoplastic resin (B) is 80% by mass or less), the impact resistance of the molded article further increases. On the other hand, when the content of the graft copolymer (A) is 60% by mass or less (the content of the other thermoplastic resin (B) is 40% by mass or more), the thermoplastic resin composition has sufficient moldability.

Optional Components

The thermoplastic resin composition of the present invention may contain optional components as needed, within a range not inhibiting light absorptivity or reflectivity, in addition to the graft copolymer (A) and the other thermoplastic resin (B).

Examples of the optional components include various stabilizers such as antioxidant or light stabilizer, and additives such as lubricant, plasticizer, release agent, dye, pigment, antistatic agent, flame retardant, metal powder, and inorganic filler.

Manufacturing Method

The thermoplastic resin composition is manufactured in a manner that the graft copolymer (A), the other thermoplastic resin (B) as needed, and optional components are mixed and dispersed using a V-type blender, Henschel mixer, or the like, and the mixture obtained in this way is melted and kneaded using a melt kneader such as a screw type extruder, a Banbury mixer, a pressure kneader, and mixing roll. In addition, the melt-kneaded material may be pelletized using a pelletizer or the like, as needed.

Average Value (Visible % R) of Light Reflectance at 380 nm to 780 nm

The thermoplastic resin composition of the present invention is required to have an average value (visible % R) of the light reflectance in the wavelength range of 380 nm to 780 nm of 5% to 10%. Here, the light reflectance is a measurement value using a test piece obtained by molding the thermoplastic resin composition to have a thickness of 2 mm. When the light reflectance is 10% or less, a reflection amount of light in the visible light region is small and the color tone of the molded article is preferable.

Average Value (Near Infrared % A) of Light Absorptivity at 780 nm to 1180 nm

The thermoplastic resin composition of the present invention is required to have an average value (near infrared % A) of the light absorptivity in the wavelength range of 780 nm to 1180 nm of 25% to 93%. Here, the light absorptivity (% A) is calculated by the following Equation (1) using the measurement values of the light reflectance (% R) and light transmittance (% T). The light reflectance is a measurement value using a test piece obtained by molding the thermoplastic resin composition to have a thickness of 2 mm. The light transmittance is a measurement value using a test piece obtained by molding the thermoplastic resin composition to have a thickness of 0.1 mm. When the light absorptivity is 93% or less, light absorption amount in the near-infrared region does not become excessive, scorching or discoloration does not occur when using the molded article as an absorbing material and laser-welding the absorbing material and the transmitting material, and the weld appearance can be prevented from deteriorating. When the light absorptivity is 25% or more, since the light absorption amount in the near-infrared region increases, sufficient bonding strength is obtained after laser welding.

$$\text{Light absorptivity (\% } A\text{)}=100-\text{light transmittance (\% } T\text{)}-\text{light reflectance (\% } R\text{)} \quad \text{Equation (1):}$$

Ratio of Optical Characteristics

In the thermoplastic resin composition of the present invention, a ratio (near infrared % A/visible % R) between the average value of the light absorptivity in the near-infrared region and the average value of the light reflectance in the visible light region is preferably 16.5 to 4.5 and further preferably 10.0 to 5.0. When the ratio is 16.5 or less, light absorption in the near-infrared region is suppressed and the scorching or discoloration of the appearance after laser welding tends to be more suppressed. On the other hand, when the ratio is 4.5 or more, sufficient bonding strength is easily obtained after laser welding and the color tone of the molded article also tends to be more excellent.

Operational Effect

In the thermoplastic resin composition of the present invention as described above, the graft copolymer (A) is included and the light reflectance in the visible light region and the light absorptivity in the near-infrared light region of test piece have specific values, therefore, it is possible to obtain a molded article that is excellent in appearance after laser welding and a color tone and has sufficient impact resistance as a resin member.

The thermoplastic resin composition of the present invention, when forming as a molded article, is excellent in color tone, has appearance after laser welding in which scorching or discoloration is suppressed, can exhibit sufficient bonding strength, and further has sufficient impact resistance as a resin member. Therefore, in the thermoplastic resin composition of the present invention, it is possible to obtain the molded article suitable for vehicle parts such as lamps, interior, and exterior, OA equipment and home appliance parts, medical instruments, and various industrial materials.

"Molded Article"

The molded article of the present invention is obtained by molding the thermoplastic resin composition of the present invention by known molding method.

Examples of molding method include an injection molding method, a press molding method, an extrusion molding method, a vacuum molding method, and a blow molding method.

The molded article of the present invention is excellent in color tone, has appearance after laser welding in which scorching or discoloration is suppressed, can exhibit sufficient bonding strength, and further has sufficient impact resistance as a resin member.

Examples of applications of the molded article include vehicle parts such as lamps, interior, and exterior, OA equipment and home appliance parts, medical instruments, and various industrial materials, and lamp for vehicles is suitable.

The molded article of the present invention can be welded to another molded article by laser welding to obtain a resin bonded body. When performing laser welding, the molded article of the present invention is used as the "absorbing material" absorbing the laser light and the other molded article is used as "transmitting material" transmitting the laser light.

A material of the transmitting material is not particularly limited as long as the material can transmit laser light, but examples thereof include an acrylic resin and polycarbonate resin.

The resin bonded body obtained by the present invention has a bonding portion, in which scorching or discoloration is suppressed, and is excellent in appearance. Moreover, sufficient bonding strength can be exhibited.

Example

Hereinafter, the present invention will be described more specifically with reference to Examples and Comparative Examples, but the present invention is not limited to the following Examples. In the following examples, "%" and "part(s)" are on a mass basis unless otherwise specified.

Various measurement and evaluation methods in the following Examples and Comparative Examples are as follows.

"Measurement and Evaluation"

Measurement of Light Reflectance (% R)

A plate-like test piece (molded article) having a length of 100 mm, a width of 100 mm, and a thickness of 2 mm was prepared from a pellet-like thermoplastic resin composition under conditions of a cylinder setting temperature of 260° C., a mold temperature of 60° C., and an injection rate of 20 g/sec, by using a 4 oz. injection molding machine (manufactured by Japan Steel Works, LTD.). Next, the total reflectance of a standard white plate ($BaSO_4$) is assumed as 100% and the total reflectance of light having a wavelength of 380 nm to 1180 nm was measured at a wavelength interval of 1 nm, using a spectrophotometer ("V-770" manufactured by JASCO Corporation).

Measurement of Light Transmittance (% T)

A film-like test piece having a thickness of 0.1 mm was prepared from the pellet-like thermoplastic resin composition at a setting temperature of 250° C. Next, the transmittance of light having a wavelength of 380 nm to 1180 nm was measured at a wavelength interval of 1 nm, using a spectrophotometer ("V-770" manufactured by JASCO Corporation).

Calculation of Light Absorptivity (% A)

The absorptivity of light having a wavelength of 380 nm to 1180 nm was calculated according to Equation (1) with a wavelength interval of 1 nm, using the measured light reflectance (% R) and light transmittance (% T).

Evaluation of Impact Resistance

A test piece (molded article) was prepared from the pellet-like thermoplastic resin composition, using an injection molding machine ("IS 55FP-1.5A" manufactured by Toshiba Machine Co., LTD.) in accordance with ISO 3167. The charpy impact strength of the obtained test piece was measured under an atmosphere of 23° C. in accordance with ISO 179.

Evaluation of Laser Welding Appearance

A plate-like test piece (molded article) having a length of 100 mm, a width of 100 mm, and a thickness of 2 mm was prepared from a pellet-like acrylic resin under conditions of a cylinder setting temperature of 260° C., a mold temperature of 60° C., and an injection rate of 20 g/sec, by using a 4 oz. injection molding machine (manufactured by Japan Steel Works, Ltd.), and the test piece was used as the transmitting material.

On the other hand, a test piece prepared using the pellet-like thermoplastic resin composition of the present invention under the same conditions as in the acrylic resin was used as the absorbing material.

The absorbing material and the transmitting material were overlapped and irradiated with a laser light from a transmitting material side under the following conditions to weld the transmitting material to the absorbing material using a laser welding device for resin (manufactured by Fine Device Co., Ltd.), thereby obtaining a resin bonded body. The weld appearance of the obtained resin bonded body was visually evaluated.

(Welding Conditions)
Output: 6 W
Focal diameter: 3 mm
Scan speed: 5 mm/sec
Weld length: 20 mm
Pressure: 0.5 MPa Evaluation of Color Tone Lightness (L value) was measured with a colorimeter using the same test piece as used for measurement of the light reflectance. As the L value was lower, the color becomes dark, and the color tone was excellent.

Manufacturing Example 1: Manufacture of Graft Copolymer (A-1)

150 parts of ion-exchanged water, 50 parts of polybutadiene latex (volume average particle diameter of 0.2 μm) in terms of solid content, 1 part of disproportionation potassium rosinate, and 0.03 parts of potassium hydroxide were charged in a reactor including a reagent injection container, a cooling pipe, a jacket heating machine, and a stirrer and heated to 60° C. Thereafter, 0.007 parts of iron(II) sulfate heptahydrate, 0.1 parts of sodium pyrophosphate, and 0.3 parts of crystalline glucose were added thereto. Next, a mixed liquid formed of 15 parts of acrylonitrile, 35 parts of styrene, 0.4 parts of cumene hydroperoxide, and 0.5 parts of t-dodecyl mercaptan was added dropwise thereto over 120 minutes and polymerized. After completion of the dropwise addition, a state of a temperature of 70° C. was kept for 60 minutes. Then, 0.05 parts of cumene hydroperoxide were added and a state of a temperature of 70° C. was further kept for 30 minutes and then cooled to obtain latex of a polybutadiene graft copolymer (A-1) in which acrylonitrile and styrene were graft-polymerized to polybutadiene.

Next, an antioxidant was added to the latex and 150 parts of 1% sulfuric acid aqueous solution was heated to 60° C. 100 parts of latex of the graft copolymer (A-1) was slowly added dropwise to the aqueous solution and was solidified. Then, the precipitate was separated, dehydrated, washed, and then dried to obtain the graft copolymer (A-1).

"Manufacture of Acid Group-Containing Copolymer Latex"

Manufacturing Example 2: Manufacture of Acid Group-Containing Copolymer Latex (K)

200 parts of ion-exchanged water, 2 parts of potassium oleate, 4 parts of sodium dioctylsulfosuccinate, 0.003 parts of iron(II) sulfate heptahydrate, 0.009 parts of disodium ethylenediaminetetraacetate, and 0.3 parts of sodium formaldehyde sulfoxylate were charged in a reactor including a reagent injection container, a cooling pipe, a jacket heating machine, and a stirrer under a nitrogen stream, and heated to 60° C. From the time reached 60° C., a mixture formed of 85 parts of n-butyl acrylate, 15 parts of methacrylic acid, and 0.5 parts of cumene hydroperoxide was continuously added dropwise over 120 minutes. After completion of the dropwise addition, aging was further performed for 2 hours in a state of maintaining 60° C. to obtain the acid group-containing copolymer latex (K) having a solid content of 33%, a polymerization conversion rate of 96%, and a volume average particle diameter of the acid group-containing copolymer of 120 nm.

Manufacturing Example 3: Manufacture of Graft Copolymer (A-2)

A mixture formed of 190 parts of ion-exchanged water, 0.6 parts of dipotassium alkenylsuccinate, 50 parts of n-butyl acrylate, 0.6 parts of allyl methacrylate, and 0.1 parts of t-butyl hydroperoxide was added to a reactor including a reagent injection container, a cooling pipe, a jacket heating machine, and a stirrer. The atmosphere was purged with nitrogen by passing a nitrogen stream through the reactor and an internal temperature was raised to 55° C. At the time that the internal temperature reached 55° C., an aqueous solution formed of 0.0001 parts of iron(II) sulfate heptahydrate, 0.0003 parts of disodium ethylenediaminetetraacetate, 0.2 parts of sodium formaldehyde sulfoxylate, and 10 parts of ion-exchanged water was added to initiate radical polymerization. After polymerization heat generation was confirmed, the jacket temperature was set to 75° C. and polymerization was continued until no polymerization heat generation was confirmed. Further, this state was maintained for 1 hour. The volume average particle diameter of the obtained rubbery polymer was 100 nm.

After the liquid temperature inside the reactor was lowered to 70° C., 0.6 parts of 5% sodium pyrophosphate aqueous solution was added as a solid content. After the internal temperature was controlled to be 70° C., 1.2 parts of the acid group-containing copolymer latex (K) was added as a solid content, stirred for 30 minutes, and enlarged to obtain latex of rubbery polymer.

The volume average particle diameter of the obtained latex-like rubbery polymer was 285 nm.

An aqueous solution formed of 0.001 parts of iron(II) sulfate heptahydrate, 0.003 parts of disodium ethylenediaminetetraacetate, 0.3 parts of sodium formaldehyde sulfoxylate, and 10 parts of ion-exchanged water was added to the obtained latex of the rubbery polymer. Next, a mixed liquid formed of 15 parts of acrylonitrile, 35 parts of styrene, and 0.225 parts of t-butyl hydroperoxide was added dropwise over 100 minutes and polymerized. After completion of the dropwise addition, a state of a temperature of 80° C. was kept for 30 minutes. Then, 0.05 parts of cumene hydroperoxide was added and a state of a temperature of 75° C. was further kept for 30 minutes and then cooled to obtain latex of a graft copolymer (A-2).

Next, 100 parts of 1.5% sulfuric acid aqueous solution was heated to 80° C. 100 parts of latex of the graft copolymer (A-2) was slowly added dropwise to the aqueous solution and was solidified. Then, the precipitate was separated, dehydrated, washed, and then dried to obtain the graft copolymer (A-2).

Manufacturing Example 4: Manufacture of Graft Copolymer (A-3)

A mixture formed of 160 parts of ion-exchanged water, 10 parts of polybutadiene latex (volume average particle diameter of 0.2 μm) in terms of solid content, 40 parts of n-butyl acrylate, 0.2 parts of dipotassium alkenylsuccinate, 0.2 parts of allyl methacrylate, 0.1 parts of Butylene glycol dimethacrylate, and 0.1 parts of t-butyl hydroperoxide was added to a reactor including a reagent injection container, a cooling pipe, a jacket heating machine, and a stirrer. The atmosphere was purged with nitrogen by passing a nitrogen stream through the reactor and an internal temperature was raised to 60° C. At the time that the internal temperature reached 60° C., an aqueous solution formed of 0.0002 parts of iron(II) sulfate heptahydrate, 0.0006 parts of disodium ethylenediaminetetraacetate, 0.25 parts of sodium formaldehyde sulfoxylate, and 3 parts of ion-exchanged water was added to initiate radical polymerization. After polymerization heat generation was confirmed, the jacket temperature was set to 75° C. and polymerization was continued until no polymerization heat generation was confirmed. Further, this state was maintained for 1 hour to carry out seed polymerization, thereby obtaining a composite rubbery polymer.

An aqueous solution formed of 0.6 parts of dipotassium alkenylsuccinate, 0.2 parts of sodium formaldehyde sulfoxylate, and 3 parts of ion-exchanged water was added to the obtained latex of the composite rubbery polymer. Next, a mixed liquid formed of 12.5 parts of acrylonitrile, 37.5 parts of styrene, 0.3 parts of t-butyl hydroperoxide, and 0.1 parts of n-octyl mercaptan was added dropwise over 120 minutes and polymerized. After completion of the dropwise addition, a state of a temperature of 80° C. was kept for 30 minutes. Then, 0.05 parts of cumene hydroperoxide was added and a state of a temperature of 75° C. was further kept for 30 minutes to complete the graft polymerization. An antioxidant was added to the polymer obtained by such a reaction to obtain a latex of the graft copolymer (A-3).

Next, 100 parts of 1.5% sulfuric acid aqueous solution was heated to 50° C. 100 parts of latex of the graft copolymer (A-3) was slowly added dropwise to the aqueous solution and was solidified. Then, the precipitate was separated, dehydrated, washed, and then dried to obtain the graft copolymer (A-3).

"Another Thermoplastic Resin (B)"

Manufacturing Example 3: Manufacture of Another Thermoplastic Resin (B-1)

27 parts of acrylonitrile and 73 parts of styrene were polymerized by known suspension polymerization to obtain an acrylonitrile-styrene copolymer having a reduced viscosity of 0.61 dl/g measured at 25° C. from a N,N-dimethylformamide solution. This copolymer was used as another thermoplastic resin (B-1).

Manufacturing Example 4: Manufacture of Another Thermoplastic Resin (B-2)

19 parts of acrylonitrile, 53 parts of styrene, and 28 parts of N-phenylmaleimide were polymerized by known continuous solution polymerization to obtain an acrylonitrile-styrene-N-phenylmaleimide terpolymer having a reduced viscosity of 0.65 dl/g measured at 25° C. from a N,N-dimethylformamide solution. This terpolymer was used as another thermoplastic resin (B-2).

Optional Components

The following was used as the pigment.
Carbon black: "#960" manufactured by Mitsubishi Chemical Corporation
Iron oxide: "KN-320" manufactured by Todakogyo Corp.
Titanium oxide: "JR-407" manufactured by Tayca Corporation The following was used as the dye.

Perinone dye: "MACROLEX Orange 3G" manufactured by LANXESS Corporation
Anthraquinone dye: "MACROLEX Red Violet R" manufactured by LANXESS Corporation
Anthraquinone dye: "MACROLEX Green 5B" manufactured by LANXESS Corporation Examples 1 to 7 and Comparative Examples 1 to 4

The graft copolymer (A), the other thermoplastic resin (B), carbon black, titanium oxide, iron oxide, and dyes in amounts shown in Tables 1 and 2 were mixed with 1 part of ethylene bisstearylamide, 0.2 parts of silicone oil SH 200 (manufactured by Dow Corning Toray Co., Ltd.), 0.2 parts of ADK STAB AO-60 (manufactured by ADEKA Corporation), and 0.4 parts of ADK STAB LA-57 (manufactured by ADEKA Corporation), using a Henschel mixer. The obtained mixture was melt-kneaded at 250° C. using a screw-type extruder ("α-type twin screw extruder TEX-30" manufactured by Japan Steel Works, LTD), and then thermoplastic resin composition pelletized with a pelletizer was obtained.

A test piece (molded article) was prepared using the obtained pellet-like thermoplastic resin composition. The light reflectance and the light transmittance were measured and the light absorptivity was calculated. Impact resistance, laser weld appearance, and a color tone were evaluated. The results thereof were shown in Tables 1 and 2.

In Tables 1 and 2, near-infrared % A/visible % R is a ratio of near-infrared % A to visible % R in a case where an average value of the light absorptivity in the near-infrared region was set as the near-infrared % A and an average value of the light reflectance in the visible light region was set as the visible % R.

As shown in Tables 1 and 2, a molded article that was excellent in impact resistance, and excellent in laser weld appearance, and further excellent in color tone was obtained from the thermoplastic resin composition obtained in each Example. In addition, in the resin bonded body obtained in each Example, the transmitting material and the absorbing material were sufficiently bonded.

On the other hand, in a case of each Comparative Example, the result was inferior to any item of impact resistance, laser weld appearance, and color tone of the molded article.

Specifically, in a case of Comparative Example 1, since the visible % R was 10% or more, the color tone was inferior.

In a case of Comparative Example 2, since the near-infrared % A was 93% or more, the laser weld appearance was inferior.

In a case of Comparative Example 3, since the near-infrared % A was less than 25%, the transmitting material and the absorbing material were not sufficiently bonded.

In a case of Comparative Example 4, since the graft copolymer (A) was not contained, the impact resistance was inferior.

INDUSTRIAL APPLICABILITY

According to the present invention, it is possible to provide a thermoplastic resin composition capable of obtaining a molded article that is excellent in appearance after laser welding and a color tone and has sufficient impact resistance as a resin member. In particular, balance between the color

TABLE 1

|  |  |  | Example |  |  |  |  |  |  |
|---|---|---|---|---|---|---|---|---|---|
|  |  |  | 1 | 2 | 3 | 4 | 5 | 6 | 7 |
| Mix [Parts by weight] | Graft copolymer (A) | A-1 | 35 | 35 | 35 | 35 | 35 |  |  |
|  |  | A-2 |  |  |  |  |  | 35 |  |
|  |  | A-3 |  |  |  |  |  |  | 35 |
|  | Another thermoplastic resin (B) | B-1 | 40 | 40 | 40 | 40 | 40 | 40 | 40 |
|  |  | B-2 | 25 | 25 | 25 | 25 | 25 | 25 | 25 |
|  | Carbon black |  | 0.10 | 0.04 | 0.50 | 0.70 | 0.08 | 0.10 | 0.10 |
|  | Titanium oxide |  | 0.60 | 0.50 | 0.50 |  | 0.40 | 0.60 | 0.60 |
|  | Iron oxide |  | 0.60 |  |  |  |  | 0.60 | 0.60 |
|  | Dye orange |  |  | 0.03 |  |  |  |  |  |
|  | Dye red |  |  | 0.14 |  | 0.03 |  |  |  |
|  | Dye green |  |  | 0.27 |  | 0.03 |  |  |  |
| Item | Visible % R |  | 7.17 | 5.67 | 5.81 | 5.22 | 9.21 | 9.16 | 8.87 |
|  | Near-infrared % A |  | 60.57 | 27.67 | 80.28 | 90.47 | 39.11 | 66.72 | 60.68 |
|  | Near-infrared % A/Visible % R |  | 8.45 | 4.88 | 13.82 | 17.33 | 4.25 | 7.28 | 6.84 |
| Physical property | Charpy impact property | [kJ/m²] | 9.1 | 8.4 | 8.9 | 8.8 | 9.0 | 6.3 | 7.8 |
|  | Weld appearance | — | A | B | B | C | B | A | A |
|  | Color tone | L value | 32.7 | 28.9 | 28.6 | 26.6 | 38.3 | 38.5 | 36.4 |

TABLE 2

|  |  |  | Comparative Example |  |  |  |
|---|---|---|---|---|---|---|
|  |  |  | 1 | 2 | 3 | 4 |
| Mix [Parts by weight] | Graft copolymer (A) | A-1 | 35 | 35 | 35 |  |
|  |  | A-2 |  |  |  |  |
|  | Another thermoplastic resin (B) | B-1 | 40 | 40 | 40 | 75 |
|  |  | B-2 | 25 | 25 | 25 | 25 |
|  | Carbon black |  | 0.05 | 1.6 | 0.02 | 0.1 |
|  | Titanium oxide |  | 1.2 |  | 0.5 | 0.6 |
|  | Iron oxide |  |  |  |  | 0.6 |
|  | Dye orange |  |  |  | 0.03 |  |
|  | Dye red |  |  |  | 0.14 |  |
|  | Dye green |  |  |  | 0.27 |  |
| Item | Visible % R |  | 10.31 | 5.21 | 6.09 | 6.89 |
|  | Near-infrared % A |  | 55.86 | 93.69 | 21.88 | 64.81 |
|  | Near-infrared % A/Visible % R |  | 5.41 | 17.98 | 3.59 | 9.41 |
| Physical property | Charpy impact property | [kJ/m²] | 9.4 | 9.0 | 9.0 | 2.3 |
|  | Weld appearance | — | — | B | C | C | B |
|  | Color tone | L value | 40.2 | 24.4 | 31.0 | 31.3 | tone of the molded article and the appearance after laser welding is in an extremely high level that cannot be obtained in a known thermoplastic resin composition of related art, and the utility value is extremely high as vehicle parts such as lamps, interior, and exterior, OA equipment and home appliance parts, medical instruments, and various industrial materials.

The invention claimed is:

1. A thermoplastic resin composition comprising a graft copolymer (A) obtained by grafting a vinyl polymer (a2) to a rubbery polymer (a1),
wherein when light reflectance (% R) and light absorptivity (% A) represented by the following Equation (1) are measured over a region from a visible light region to a near-infrared light region at a wavelength interval of 1 nm, an average value (visible % R) of the light reflectance at 380 nm to 780 nm is 5% to 10%, and
an average value (near infrared % A) of the light absorptivity at 780 nm to 1180 nm is 25% to 93%, $$\text{Light absorptivity (\% }A) = 100 - \text{light transmittance (\% }T) - \text{light reflectance (\% }R) \quad \text{Equation (1)}.$$

2. The thermoplastic resin composition according to claim 1,
wherein a ratio (near infrared % A/visible % R) between the average value of the light absorptivity in the near-infrared region and the average value of the light reflectance in the visible light region is 16.5 to 4.5.

3. A molded article obtained by molding the thermoplastic resin composition according to claim 1.

4. A molded article obtained by molding the thermoplastic resin composition according to claim 2.

* * * * *